METAL FRAME FOR EYEGLASSES

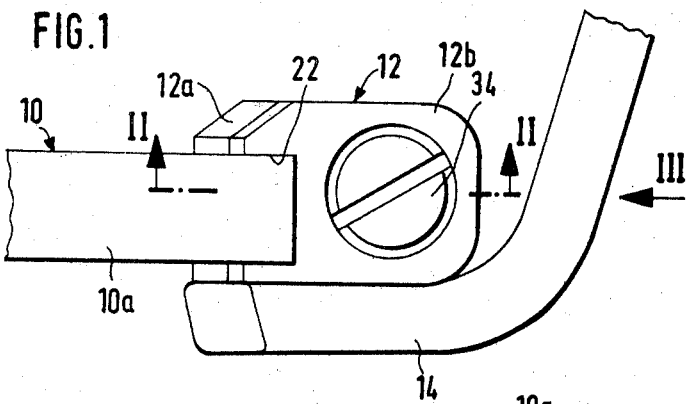
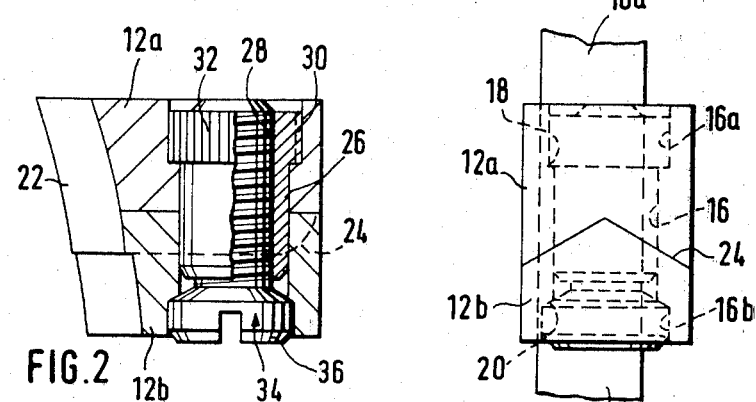
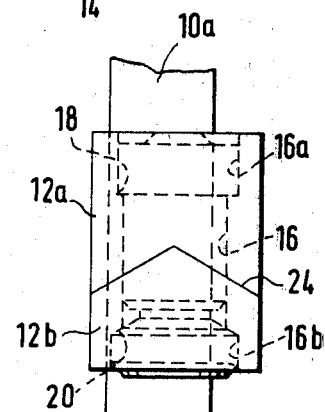
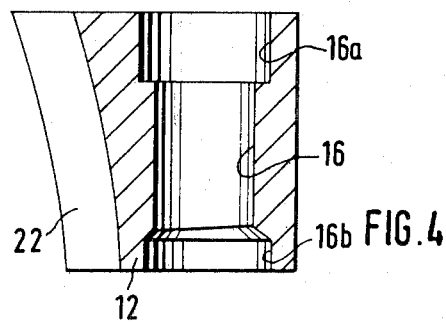

This application is a continuation, of application Ser. No. 944,671, filed Sept. 22, 1978 now U.S. Pat. No. 4,277,151.

The subject invention relates to a metal frame for eyeglasses. More particularly, it relates to such an eyeglass metal frame having a locking bar mounted on each lens rim, wherein the lens rim and the locking bar are separated by a separation slot, and wherein both portions of the lens rim and both segments of the locking bar are clamped together by means of a locking bar screw.

The locking bar is soldered onto the lens rims and is subsequently cut open or slotted together with the lens rim, so that the lens rims may be widened for inserting the eyeglass lens and so that it may be subsequently closed around the eyeglass lens by insertion of the locking bar screw.

In the known locking bar structure, the thread for the locking bar screw is cut into the still uncut or closed locking bar and the locking bar is subsequently soldered and finally slotted or cut open. The cutting operation results in the formation of edges or ridges which requires an aftercutting of the thread. The aftercutting of the thread is not only an additional operating step, but also results in undesirable tolerances.

Since the temple portion or ear supported side arms of the eyeglass frame is soldered together with the lens rims in the range of the locking bar, a two-time heating takes place in the range of the locking bar, so that the locking bar thread is present in the soft, heated material which is a further disadvantage of the known structure.

It is therefore an object of the subject invention to improve a metal frame for eyeglasses of the aforementioned type in that the clamping of the locking bar may be carried out with a thread of high precision, whereby an aftercutting of the thread after the separation cut and an impairment of the thread due to the soldering operation in the range of the locking bar is eliminated.

This object of the invention is obtained in that a jacket or casing having an inner thread is coupled with a first locking bar segment in such a way so as to prevent movement thereof relative to the first locking bar segment towards the second locking bar segment, and wherein the locking bar screw is mounted on the other locking bar segment and is in threaded engagement with the jacket.

The inventive structure is advantageous in that the thread is mounted in a structural part which is insertable into the locking bar after the cutting and soldering steps, so that it is not influenced by either the cutting operation or the soldering operation. Furthermore, the jacket may be made of a very hard material.

An advantageous embodiment of the invention employs a jacket for engaging both locking bar segments. Thereby, a centering of the two locking bar segments in axial direction of the thread is obtained, in contrast to the known structure.

In a further advantageous embodiment of the invention, the jacket is secured against turning by a circumferential segment which is positively in engagement with the first locking bar segment.

In a still further advantageous embodiment of the invention, the jacket is partly slotted for securing the screw and is spread apart by the locking bar screw.

In a further advantageous embodiment of the invention, the locking bar is provided with an asymetric bore for securing the screw.

Other objects and features of the present invention will become apparent from the following detailed description when taken in connection with the accompanying drawing which discloses several embodiments of the invention. It is to be understood that the drawing is designed for the purposes of illustration only, and is not intended as a definition of the limits and scope of the invention disclosed.

In the drawing, wherein similar reference numerals denote similar elements throughout the several views:

FIG. 1 is a fragmentarily-illustrated, bottom plan view of an eyeglass metal frame embodying the present invention in the range of the locking bar;

FIG. 2 is a sectional view, in part elevation, taken along line II—II of FIG. 1;

FIG. 3 is a side elevational view taken in the direction of the arrow III in FIG. 1; and FIG. 4 is a sectional view of the locking bar with an asymmetrical bore.

Referring now in detail to the drawing, a right eye lens rim 10 of a metal frame is shown in FIG. 1, with a soldered-on locking bar 2 and a temple portion or rearwardly projecting side arm 14 of the right eyeglass frame which is also coupled with the locking bar 12 and as later explained in more detail, is coupled with one of the two locking bar segments and thereby with the lens rim.

For reasons of clarity, the lens rim 10 is omitted in FIG. 2 as well as the temple portion 14, and in FIG. 3 the temple portion 14 is omitted.

A locking bar 12 is provided with a through bore 16 having expanded cross sectional segments 16a, 16b on both ends thereof so that engagement shoulders 18, 20 are formed. Locking bar 12 having bore 16 is soldered to lens rim 10, and it is provided with a groove 22 for properly seating lens rim 10. After the lens rim and the locking bar are soldered together, locking bar 12 and lens rim 10 are separated by a V-shaped cut or slot 24 (FIG. 3) so that the lens rim forms a slotted ring in the range of locking bar 12 which can be widened for inserting an eyeglass lens. The cut 24 separates the lens rims and locking bar 12 into an upper lens rim portion 10a, coupled to an upper locking bar segment 12a and a lower lens rim portion 10b coupled to a lower locking bar segment 12b. The temple portion 14 of the bow of the eyeglasses is soldered to the upper locking bar segment 12a and/or with the upper lens rim portion 10a, after the cut was made, so that the bow or side arm together with the upper portion 10a and segment 12a of the lens rim and the locking bar respectively, can cooperate during the opening and closing movement when inserting the eyeglass lens.

After finishing the soldering and cutting operations, a steel jacket 26 (FIG. 2) is inserted into bore 16. The jacket 20 is provided with an inner thread 28 and a shoulder 32 having a milled edge 30 on one end, so that the shoulder 32 may abut a further shoulder 18 in the upper locking bar segment 12a. The milled edge 30 prevents jacket 26 from turning in bore 16, since it positively engages the adjacent wall of bore 16 when jacket 26 is pressed into bore 16.

Instead of the milled edge 30, jacket 26 may also have a non-round shoulder, for example, a square shoulder which cooperates with a correspondingly shaped segment of bore 16, for preventing a turning of jacket 16.

United States Patent [19]

Rossbach

[11] 4,406,528
[45] Sep. 27, 1983

[54] MOTION PICTURE APPARATUS

[75] Inventor: Horst Rossbach, Eichenau, Fed. Rep. of Germany

[73] Assignee: Agfa-Gevaert AG, Leverkusen, Fed. Rep. of Germany

[21] Appl. No.: 294,168

[22] Filed: Aug. 19, 1981

[30] Foreign Application Priority Data

Aug. 19, 1980 [DE] Fed. Rep. of Germany ....... 3031305

[51] Int. Cl.³ ............................................. G03B 21/38
[52] U.S. Cl. .................................... 352/169; 352/137
[58] Field of Search .................. 352/169, 92, 137, 121

[56] References Cited

U.S. PATENT DOCUMENTS

| | | | |
|---|---|---|---|
| 3,368,863 | 2/1968 | Mueller | 352/169 |
| 3,432,228 | 3/1969 | Hellmund | 352/169 |
| 3,788,736 | 1/1974 | Oulevay et al. | 352/169 |
| 3,851,959 | 12/1974 | Kreutze et al. | 352/169 |
| 3,958,872 | 5/1976 | Roth | 352/169 |

*Primary Examiner*—Monroe H. Hayes

*Attorney, Agent, or Firm*—Michael J. Striker

[57] ABSTRACT

A motion picture apparatus is provided which comprises a rotary disc shutter having a shutter sector and actuated by an electric drive device. A claw mechanism is controlled by the electric drive device and provides for transport of a film. An electromagnetic solenoid provides for stopping the film in position. A plunger for the solenoid is provided for disengaging the claw transport mechanism after a frame transport phase upon generation of an appropriate signal. A position signal generator provides a shutter position signal depending on the position of the shutter sector and a marking signal generator provides a signal depending on the detection of a marking placed on the film. The position signal generator is connected to a first input of an AND gate and the marking signal generator is connected to a second input of the AND gate. The output of the AND gate is connected to the solenoid.

The apparatus and a corresponding method provide for stopping a film without interference in proper position.

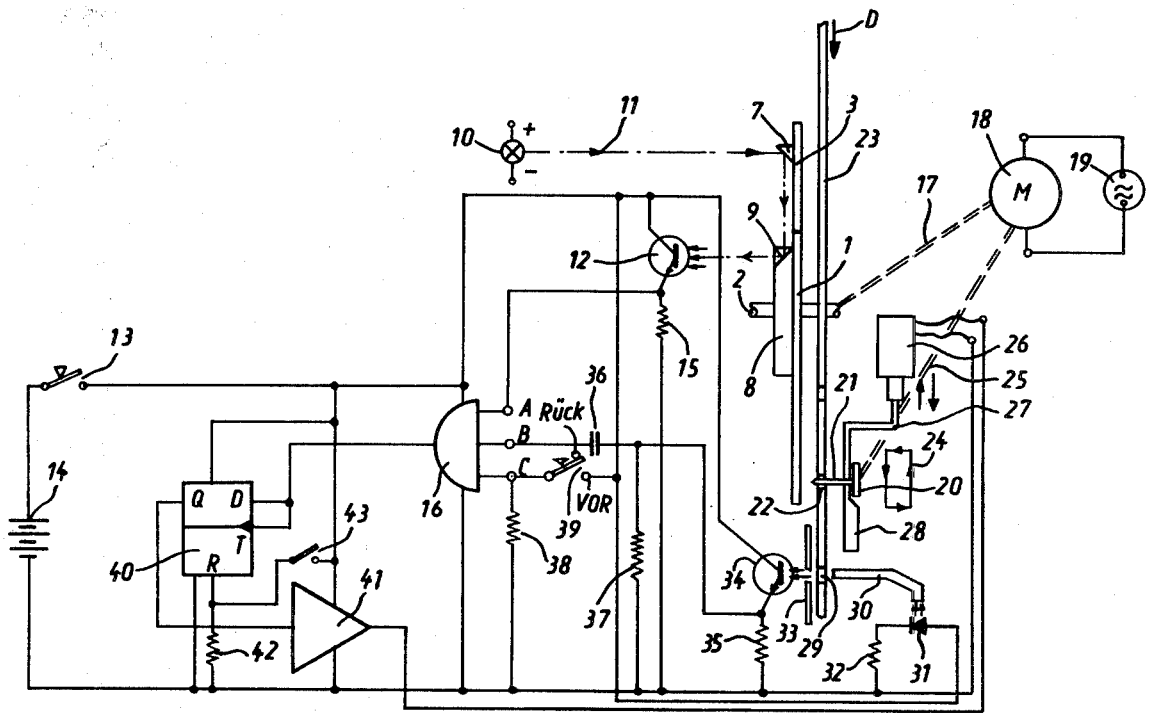

21 Claims, 5 Drawing Figures